April 2, 1946.  I. POMIERANIEC  2,397,691
POTATO-PLANTING MACHINE
Filed Sept. 28, 1943  3 Sheets-Sheet 2

Inventor
I. POMIERANIEC
By
Attorneys

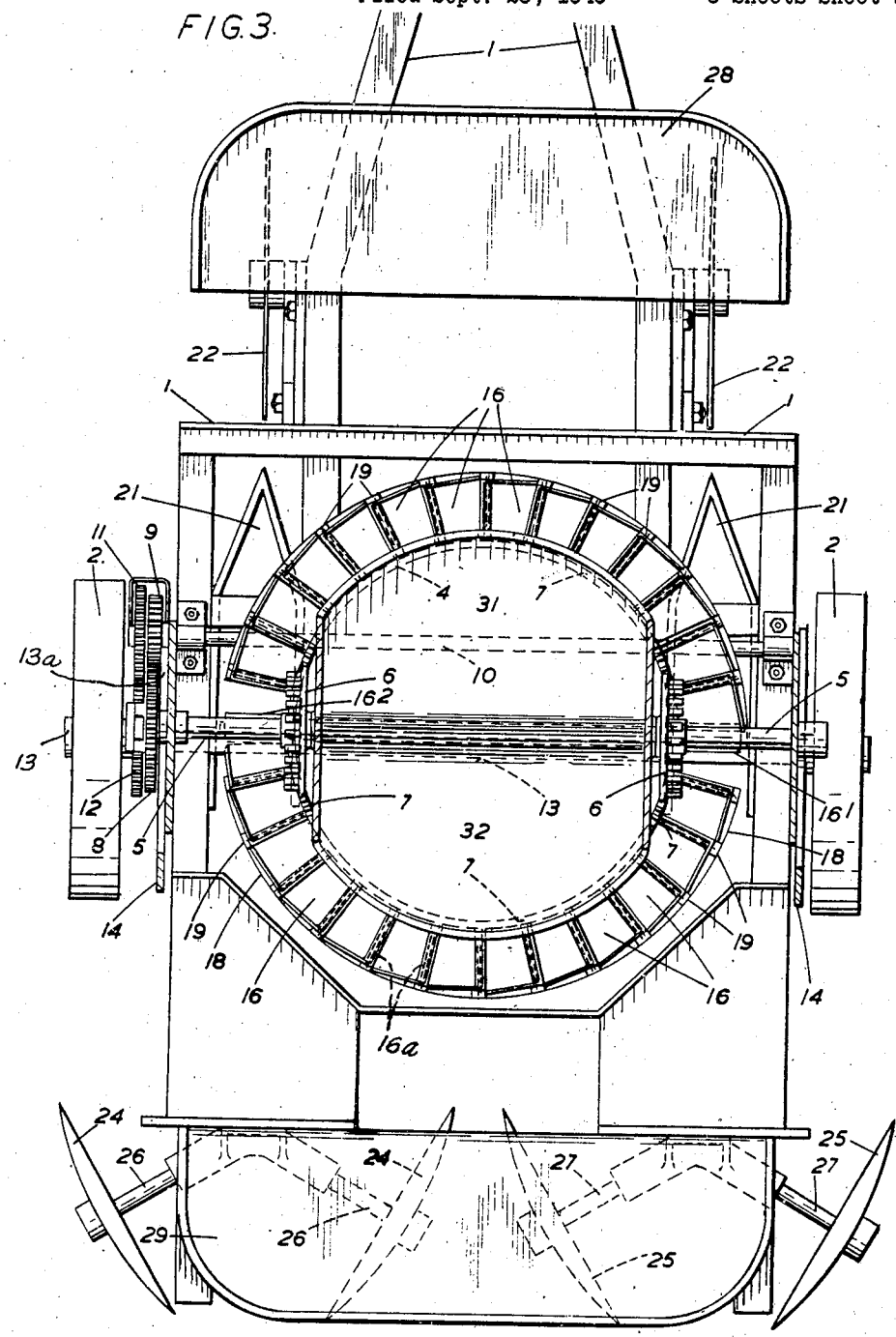

Patented Apr. 2, 1946

2,397,691

UNITED STATES PATENT OFFICE 2,397,691

POTATO-PLANTING MACHINE

Israel Pomieraniec, London, England, assignor to Transplanters (Robot) Limited, Sandridge, near St. Albans, England, a company of Great Britain Application September 28, 1943, Serial No. 504,175 In Great Britain September 9, 1942

4 Claims. (Cl. 111—34)

This invention relates to improvements in or relating to potato-planting machines.

Potato-planting machines are already known wherein an endless conveyor operating in a vertical plane is provided with supports for individual potatoes, the potatoes being discharged by said supports becoming inverted during the progress of the conveyor. These known machines therefore are only adapted for planting a single row of potatoes during each traverse of the ground concerned and the feeding and conveying mechanism is necessarily of a somewhat complex nature.

One of the objects of the present invention is to provide an improved potato-planting machine which enables planting operations to be carried out more quickly and easily than is possible with known machines.

A further object is to provide a machine which is capable of planting a plurality of rows of potatoes each time the machine traverses the planting ground.

Another object is to provide a machine which not only delivers potatoes to the ground but also forms furrows for receiving such potatoes and closes the soil over the delivered potatoes.

Other objects of the invention will be apparent from the following description and claims.

According to one feature of the present invention there is provided a potato-planting machine having mechanism for conveying potatoes to delivery points located in different positions transversely with respect to said machine so as to permit of a plurality of rows of potatoes being delivered to the ground each time the machine traverses the latter.

According to another feature of the present invention there is provided a potato-planting machine having potato-conveying mechanism which is caused to move transversely across the machine for at least a part of its travel and means for effecting delivery of potatoes from said conveying mechanism at a plurality of different positions transversely with respect to said machine whereby said conveying mechanism is adapted to supply potatoes in a plurality of rows each time the machine traverses the planting ground.

The aforesaid conveying mechanism is advantageously in the form of a turntable or wheel mounted for rotation in a horizontal plane and driven in any suitable way for instance by the road wheels of the machine through any suitable gearing or by means of an independent motor.

The aforesaid conveying mechanism may include any suitable potato-carrying devices and these may for instance be in the form of cups.

Potatoes may be discharged from the aforesaid potato-carrying devices in any suitable way but I at present preferably provide cups or the like which are pivotally mounted so that they can swing downwardly and so allow the potatoes to fall therefrom at the desired points in their travel. In such cases the carriers may normally be retained in their supporting positions and be caused or permitted to assume their delivery positions in any suitable way. Thus, for instance guiding rails, platforms or the like may be located immediately under the conveying mechanism so as to prevent said carriers from swinging into their discharging positions throughout that part of their travel where no delivery is to be effected and interruptions may be made in said rails, platforms or the like at the desired delivery points so that at those point said carriers can move under the influence of gravity and/or under the effect of subsidiary striking mechanism located in their path into their discharging positions and the continued operation of the conveying mechanism may automatically effect the return of said carrying devices into their supporting positions.

In another arrangement I may employ cam rails or the like for controlling the desired movements of said carriers.

Loading stations are provided between the delivery points of a machine according to the present invention and a hopper is preferably provided from which the loading can be effected. The loading may be carried out by hand and in such cases and assuming that the conveying mechanism is of a turntable nature the hopper is advantageously located at the centre of the turntable or in a position extending diametrically thereacross. In order to facilitate the manual loading operation to the greatest possible extent the hopper may include trays extending outwardly to the loading points and communicating with said hopper through a restricted opening so that only a limited number of potatoes are fed to said trays and the latter are automatically replenished as long as there are any potatoes in the hopper.

A machine according to the present invention may be adapted for feeding potatoes in more than two rows but for simplicity and having regard to the limitations ordinarily imposed on the size of the machine it will usually be desirable to adapt the machine for delivering potatoes in two rows only. In such cases the delivery may take place at the two sides of the machine and the loading positions may be located at the front and rear of the conveying mechanism.

A machine according to the present invention preferably includes plows located under the aforesaid delivery points so that as the machine progresses along the ground potato-receiving furrows are automatically formed and the machine may also include means for closing said furrows after the potatoes have been delivered. Thus, for instance, adjustable soil pressing wheels may be provided, or pairs of discs, plates or the like suitably inclined for ridging the earth over the delivered potatoes may be trailed by the machine.

If desired, manure or other material for treating the soil or exerting a favorable influence on the growth of the potatoes and/or resisting attack by soil pests may be fed to the ground automatically by the operation of the potato-conveying and delivering mechanism. Thus, for instance, the arrival of a potato-carrying device at its discharging position may automatically bring its distributing mechanism into a position for discharging a predetermined amount of manure or other desired material on to the ground so that in operation a predetermined amount of manure or other desired material is supplied in contact with or adjacent to each potato.

In order that the present invention may be well understood I will now describe, by way of example only, one embodiment thereof with reference to the accompanying drawings in which:

Figure 3 is a sectional plan view taken just above the potato conveyor.

Figure 1:
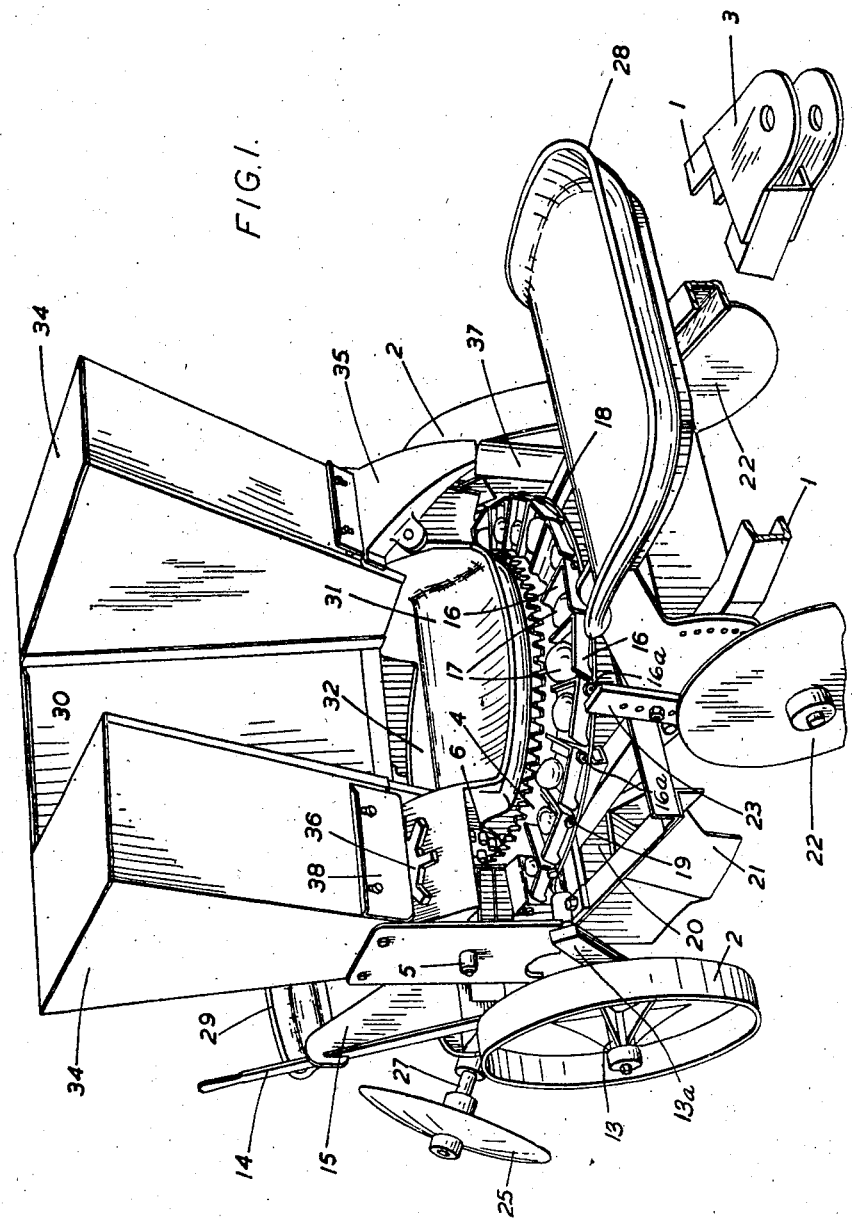
Figure 1 is a front perspective view of the machine.

Referring to the figures, the machine includes a frame 1 mounted on a pair of wheels 2, 2 and having a hitch 3 at its leading end for connection to a tractor, although it is of course also within the scope of the present invention to provide a self-propelling machine.

A conveyor wheel 4 is mounted on the frame 1 and arranged for rotation in a horizontal plane, the said conveyor wheel being driven from the axle of the wheels 2, 2 for instance by means of the gearing shown, i. e., by means of a shaft 5 having toothed wheels 6, 6 engaging crown teeth 7 on the wheel 4, the said shaft 5 having a gear wheel 8 engaging a pinion 9 fitted to a lay shaft 10 and the latter shaft also carrying a gear wheel 11 making engagement with a gear wheel 12 carried on one of the stub axles 13 of the road wheels 2, 2. The aforesaid axle 13 and shafts 10 and 5 are journalled in the frame 1 of the machine and the above mentioned gear wheels and pinions are keyed to the shafts on which they are mounted.

The stub axles 13 are carried by crank arms 13' extending from the shaft 10 and by rocking such crank arms the frame of the machine can be raised or lowered with respect to the road wheels. Levers 14 extend from the said crank arms on each side of the machine and by swinging these levers the desired rocking of the crank arms can be easily effected.

Figure 2:
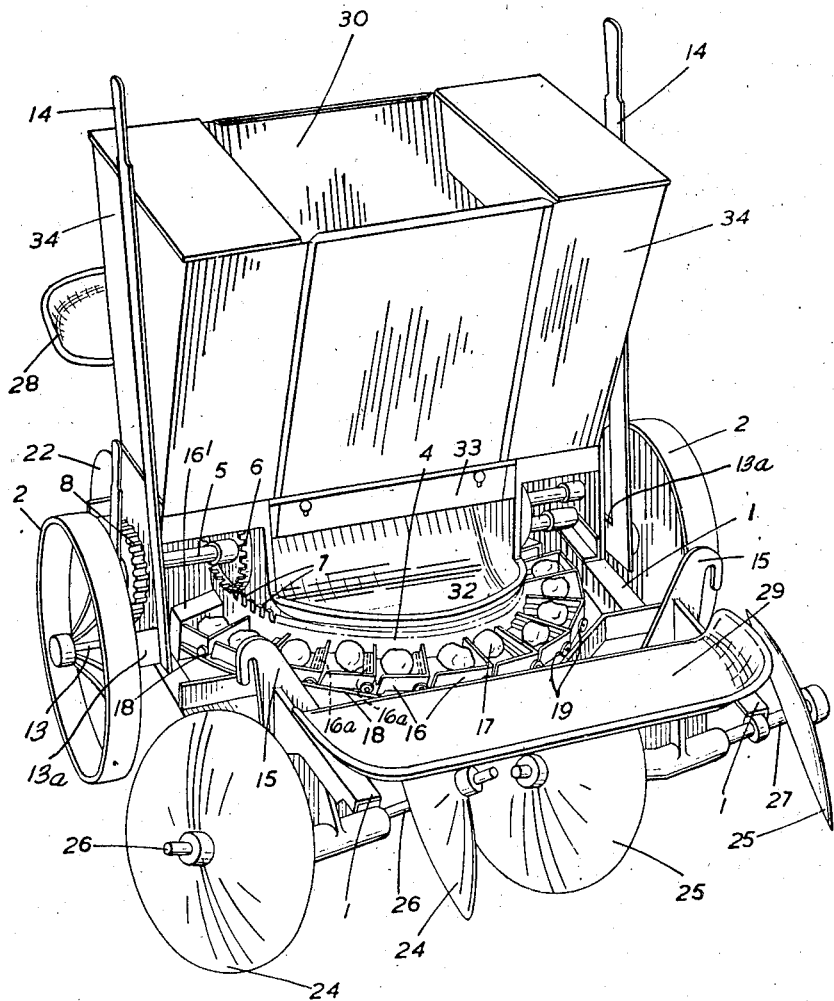
Figure 2 is a rear perspective view of the machine shown in Figure 1.

When the levers 14 are in the vertical positions shown in Fig. 2 the frame is located in its lowermost position, i. e., in a position in which the gear wheels 11 and 12 mesh with one another and drive is accordingly transmitted to the conveyor wheel but when said levers are swung downwardly into the positions shown in Fig. 1, the frame is raised to its uppermost position so disengaging the gear wheels 11 and 12 and accordingly interrupting the drive to the said conveyor wheel, hooked members 15 or other suitable means being provided for locking the levers in their depressed positions.

The aforesaid conveyor wheel 4 has a plurality of potato-receiving cups 16 fitted around its periphery, the said cups being pivotally carried on pivot pins 16a extending radially from said conveyor and terminating in rollers 19. The aforesaid cups have front walls and outer side walls for preventing the potatoes 17 from rolling therefrom and they are normally prevented from swinging downwardly by means of a circular track 18 over which said cups are caused to travel, the aforesaid rollers 19 running on said track.

The machine shown in the drawings is adapted for delivering potatoes in two rows and openings are accordingly provided in the track 18 at diametrically opposed positions adjacent to the respective sides of the machine, said openings being of a size appropriate for enabling the cups to swing downwardly, i. e., into the position occupied by the cup designated $16^1$ in Figure 2 and $16^1$ and $16^2$ in Figure 3.

The conveyor wheel 4 is caused to rotate in a direction which results in the pivoted cups being trailed over the aforesaid openings, i. e., the cups suddenly swing downwardly when their trailing edges reach the rear ends of the openings in the tracks and engagement of said cups with the forward ends of said openings during continued rotation of the conveyor wheel automatically restores said cups to positions in which they are horizontally disposed and supported on the track 18, the said forward edges being downwardly inclined if desired in order to promote the desired upward movement of the cups.

The above described potato conveyor preferably extends over substantially the full width of the frame of the machine and it will be understood that such conveyor may include any desired number of cups 16 although twenty-four will usually be found to be a suitable number.

A potato delivery chute 20 is provided on each side of the planting machine in a position having its inlet immediately under the abovementioned opening permitting of the downward swinging of the cups 16, and a plow 21 is secured to or formed integrally with said chute, said plow being substantially of V or concaved triangular form. In this way it is ensured that potatoes are delivered into the bases of the furrows made by the said plows.

Soil cutting discs 22 are preferably fitted to the leading part of the machine, such discs being located in alignment with the points of the plows 21. These soil cutting discs are preferably adjustable in a vertical direction, for instance, by being carried on plates 23 which can be secured to the frame of the machine by means of a bolt engaging selected holes of a series of holes as indicated in Figure 1.

The machine shown in the drawings also includes means for closing the soil over the delivered potatoes, such means comprising pairs of inclined discs or blades 24, 24 and 25, 25. These discs or blades may be mounted on axles 26, 27 bent as indicated in order to position the discs appropriately for closing the furrows made by the plows. These discs are preferably adjustable along their axles so that their distance of separation may be varied and their axles are preferably adjustable vertically so that control can be exerted over the earthing-up operation.

The above described machine has two loading positions disposed at the front and back of the conveyor wheel 4, and seats 28 and 29 are preferably provided for the loaders.

In order to facilitate the supplying of potatoes to the loaders, a hopper 30 is mounted in the center of the machine and trays 31 and 32 are provided under the outlet from said hopper. The front panel of the hopper is removed in the machine shown in Figure 1 in order to expose the disposition of the said trays and it will be seen that these are slightly downwardly and outwardly curved so that they are automatically replenished as long as there are any potatoes in the hopper 30. The desired automatic feeding of the potatoes on to the trays 31 and 32 can be to some extent controlled by means of vertically adjustable shutters one of which is shown in Figure 2 and designated 33, the provision of such shutters being particularly desirable if the machine has to deal with potatoes of very varying sizes.

By providing the above mentioned means for smoothly feeding potatoes from the hopper 30 to the trays 31 and 32, i. e., to positions where they are very readily accessible to the loaders, the loading operation can be very quickly and easily carried out.

The casings 34, 34, shown at the sides of the potato hopper 30, are provided for receiving manure or other desired material for treating the soil and/or the potatoes. Outlet chutes are provided for delivering such material to the earth either just in advance of the plows or through the potato delivery chutes, a suitable chute 35 being shown at the right hand side of Figure 1 but the left hand one being removed in order to expose a distributor 36 consisting of a spider which is rotated for instance by gearing operated from the road wheel axle, said distributor serving to deliver a determined amount of manure or other desired material for instance to each potato as the latter is planted. The aforesaid chute 35 may cooperate with a subsidiary and adjustable chute 37 enabling control to be exerted over the particular point at which the material is delivered.

If desired an adjustable plate, such as the plate 38 shown at the left hand side of Figure 1, may be provided for exerting control over the amount of material delivered by the distributor 36 to the chute 35.

When it is desired to move the above described machine without performing any potato planting operation, the levers 14 are swung downwardly so lifting the frame of the machine and thereby raising the plows 21 above ground level and in some cases also raising the soil cutting discs 22 above ground level although the latter may be raised by independent adjustment. Such upward movement of the frame also disconnects the gear drive to the potato conveyor 4 in the manner already described. When however the machine is required to perform planting operations the levers 14 are swung into the position shown in Figure 2 so lowering the plows 21 so that they extend to the desired depth into the ground, the soil cutting discs 22 being also lowered and the gearing to the conveyor wheel 4 being engaged by the said movement of the levers 14. Traverse of the machine over the ground to be planted will then automatically plow two furrows in the soil, deliver potatoes thereto at regular intervals, deliver manure or other material to the soil (if desired), and close the soil over the planted potatoes, the only manual operation being the supplying of potatoes to the cups 16 of the conveyor wheel.

Whilst I have hereinbefore described one embodiment of the present invention I wish it to be understood that the specific details may be varied or modified without departing from the scope thereof.

I claim:

1. A potato planting machine including a conveyor having flaps pivotally mounted thereon, each flap comprising a front wall and an outer sidewall of unitary form, said flaps when in horizontal position forming potato-receiving cups of which the rear walls are formed by the front walls of succeeding flaps and inner side walls are formed by parts of the conveyor, and arranged to break their cup formations when moved from horizontal to inclined positions for delivering potatoes therein contained, and a platform over which the conveyor is movable, said platform affording reaches of horizontal support for the conveyor and regions of inclination of the flaps, and being apertured in the regions of inclination, to permit potatoes delivered from the cups to drop to the ground.

2. A potato planting machine according to claim 1 wherein the supporting platform is arranged to move the flaps into their inclined, potato-delivering positions successively as they come into registration with the apertures in said platform.

3. A potato planting machine according to claim 1 wherein said conveyor comprises a wheel, pivot pins extend radially with respect to the wheel, and the flaps are mounted on said pivot pins.

4. A potato planting machine according to claim 1 wherein said conveyor comprises a wheel, pivot pins extend radially of said wheel, said flaps with two unitary formed walls are mounted on said pivot pins, and said platform is provided with two apertures located in the path of the flaps on opposite sides of the axis of the conveyor wheel and in regions of downward inclination of the flaps.

ISRAEL POMIERANIEC.